United States Patent
Grant et al.

(10) Patent No.: US 11,252,490 B2
(45) Date of Patent: Feb. 15, 2022

(54) APPLIANCE SUITE EQUIPPED WITH A SYNCED SOUND SYSTEM

(71) Applicant: Haier US Appliance Solutions, Inc., Wilmington, DE (US)

(72) Inventors: Russell Conrad Grant, Louisville, KY (US); Christopher George Bissig, Louisville, KY (US); Chen Lu, Louisville, KY (US); Joel A. Persinger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 262 days.

(21) Appl. No.: 16/546,391

(22) Filed: Aug. 21, 2019

(65) Prior Publication Data

US 2021/0058689 A1   Feb. 25, 2021

(51) Int. Cl.
| | | |
|---|---|---|
| H04R 1/02 | (2006.01) | |
| F25D 23/12 | (2006.01) | |
| H04B 10/114 | (2013.01) | |
| F25D 29/00 | (2006.01) | |
| H04R 3/12 | (2006.01) | |
| H04R 1/26 | (2006.01) | |
| F24C 7/08 | (2006.01) | |

(52) U.S. Cl.
CPC ............ *H04R 1/026* (2013.01); *F25D 23/12* (2013.01); *H04B 10/1149* (2013.01); *F24C 7/08* (2013.01); *F24C 7/088* (2013.01); *F25D 29/008* (2013.01); *F25D 2700/04* (2013.01); *H04R 1/26* (2013.01); *H04R 3/12* (2013.01)

(58) Field of Classification Search
CPC .. H04R 1/026; H04R 1/26; H04R 3/12; F25D 23/12; F25D 29/008; F25D 2700/04; H04B 10/1149; F24C 7/08; F24C 7/088
See application file for complete search history.

(56) References Cited

U.S. PATENT DOCUMENTS

| | | |
|---|---|---|
| 5,889,843 A | 3/1999 | Singer et al. |
| 2002/0005787 A1 | 1/2002 | Gabai |
| 2011/0218953 A1 | 9/2011 | Hale |
| 2014/0251987 A1* | 9/2014 | Reay ................... H05B 6/6447 219/756 |
| 2018/0158288 A1* | 6/2018 | Logan .................... G01S 19/51 |
| 2019/0374060 A1* | 12/2019 | Winterrose ........... A47J 36/321 |

FOREIGN PATENT DOCUMENTS

| | | |
|---|---|---|
| GB | 2313924 A | 12/1997 |
| JP | 2017069835 A | 4/2017 |

* cited by examiner

*Primary Examiner* — Andrew L Sniezek
(74) *Attorney, Agent, or Firm* — Dority & Manning, P.A.

(57) ABSTRACT

A system and a method for generated synchronized audible communications are provided. In one aspect, a system includes a suite of appliances, including at least a first and second appliance. Each appliance has a speaker operable to generate one or more audible communications. The system includes one or more controllers that output one or more sound commands that cause the speakers of the appliances to generate their respective audible communications. One or more of the appliances include a proximity device operable to detect whether a user is within a proximity range thereof. In some instances, the speakers can generate audible communications to amplify their audible communications. In other instances, the speakers can generate audible communications to create localization cues for directing a user's attention to a particular appliance.

20 Claims, 5 Drawing Sheets

APPLIANCE SUITE EQUIPPED WITH A SYNCED SOUND SYSTEM

FIELD OF THE INVENTION

The subject matter of the present disclosure relates generally to appliances, and more particularly to an appliance suite equipped with a synced sound system.

BACKGROUND OF THE INVENTION

In some instances, consumers may have difficulty hearing auditory alerts or other audible communications generated by speakers of their appliances. For instance, a consumer may have difficulty hearing a timer alert generated by an oven appliance if he or she is not in the kitchen where the oven appliance is located. Some appliances include speakers that are insufficient or not capable of producing the necessary volume for a consumer to hear a generated alert throughout their home. Not being able to hear generated alerts and the resulting consequences of missing alerts may be inconvenient to consumers.

Moreover, many consumers desire to have rich media experiences with their appliance suites, particularly in the kitchen. For instance, consumers may desire to stream media content on display devices of their appliances for step-by-step cooking instructions, listen to music, and engage in other media activities while in the kitchen. Many appliances only include a single type of speaker capable of producing sounds at certain frequencies and intensity. As consumers desire more immersive sonic experiences, such speaker capabilities may be limiting and may provide a less than desirable media experience.

Accordingly, improved systems and methods that address one or more of the challenges noted above would be useful.

BRIEF DESCRIPTION OF THE INVENTION

Aspects and advantages of embodiments of the present disclosure will be set forth in part in the following description, or may be learned from the description, or may be learned through practice of the embodiments.

In one aspect, a system is provided. The system includes a first appliance having a first speaker and a second appliance having a second speaker. The system also includes one or more controllers communicatively coupled with the first speaker and the second speaker and operable to output one or more sound commands. The first speaker is configured to: receive at least one of the one or more sound commands output by the one or more controllers; and in response to the received at least one of the one or more sound commands, generate one or more audible communications. Furthermore, the second speaker is configured to: receive at least one of the one or more sound commands output by the one or more controllers; and in response to the received at least one of the one or more sound commands, generate one or more audible communications such that the one or more audible communications generated by the first speaker and the one or more audible communications generated by the second speaker are synced.

In another aspect, a method is provided. The method includes receiving, by one or more controllers, one or more detection signals indicative of whether a user is within a proximity range of a proximity device of at least one of a first appliance and a second appliance. Further, the method includes outputting, by the one or more controllers, one or more sound commands based at least in part on whether the user is within the proximity range of the proximity device of at least one of the first appliance and the second appliance. Moreover, the method includes generating, by a first speaker of the first appliance, one or more audible communications based at least in part on the one or more sound commands. In addition, the method includes generating, by a second speaker of the second appliance, one or more audible communications based at least in part on the one or more sound commands.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
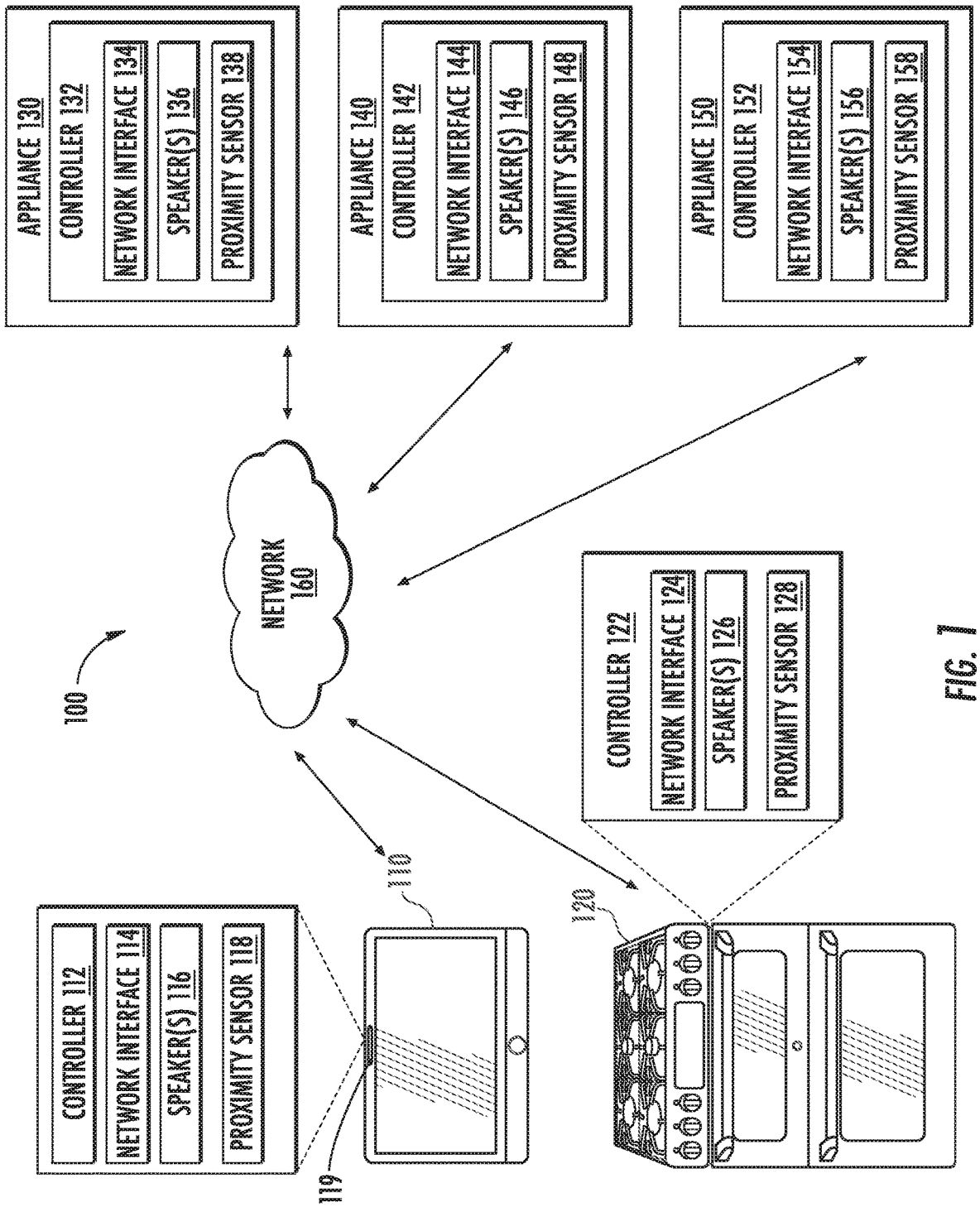
FIG. 1 provides a schematic view of an exemplary system according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is noted that, for the purposes of the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

FIG. 1 provides a schematic view of a system 100 according to an exemplary embodiment of the present disclosure. System 100 includes an appliance suite equipped with a synced sound system. As will be explained herein, various speakers of the appliances of the appliance suite can generate one or more audible communications in a synced manner based at least in part on one or more outputted sound commands by one or more controllers. The audible communications are generated in a synced manner in that they are audibly arranged to produce a specific result or accomplish a specific task. For instance, the audible communications can be generated to amplify an alarm or alert of an appliance, to draw a user's attention to a particular appliance, and/or to create a more immersive and intuitive sonic experience for a user with his or her appliance suite.

The appliance suite includes a plurality of appliances (e.g., at least two appliances), including a first appliance 110, a second appliance 120, a third appliance 130, a fourth appliance 140, and a fifth appliance 150. The appliances 110, 120, 130, 140, 150 of system 100 can be any suitable type of appliance. For instance, the appliances 110, 120, 130, 140, 150 of system 100 can be, without limitation, a washing machine appliance, dryer appliance, microwave appliance, oven appliance, cooktop appliance, range appliance, water heater appliance, dishwasher appliance, refrigerator appliance, freezer appliance, icemaker appliance, or kitchen hub cooking system. Other consumer appliances are contemplated. For the depicted embodiment of FIG. 1, first appliance 110 is a smart kitchen hub embodied as a display device with exhaust features; second appliance 120 is a range appliance having a cooktop appliance and an oven appliance; third appliance 130 is a microwave appliance; fourth appliance 140 is a dishwasher appliance; and fifth appliance 150 is a refrigerator appliance. First appliance 110 (e.g., smart kitchen hub) can be placed vertically above second appliance 120 (e.g., range appliance). Furthermore, the suite of appliances of FIG. 1 can be positioned within a consumer's kitchen. Although five (5) appliances are shown in FIG. 1, in other embodiments, system 100 can have more or less than (5) appliances. In some embodiments, system 100 includes at least two (2) appliances.

Each appliance 110, 120, 130, 140, 150 of system 100 can include a controller, a network interface, and a communication module. The communication module of each appliance can include one or more speakers as well as other devices, such as one or more microphones for receiving voice commands from a consumer. Particularly, for the illustrated embodiment of FIG. 1, first appliance 110 includes a controller 112, a network interface 114, and a communication module that includes one or more speakers 116. As will be explained herein, speaker 116 can be synched with speakers of other appliances of system 100 to generate synced audible communications, e.g., alerts, music, voice instructions, etc. to create a more immersive sonic experience. First appliance 110 can also include one or more proximity devices for determining whether a consumer is in a proximity range of first appliance 110. As one example, the proximity device can be a proximity sensor 118. As another example, the proximity device can be an imaging device, such as a camera 119.

Controller 112 can include one or more processors and one or more memory devices. The processor(s) of controller 112 can be any suitable processing device, such as a microprocessor, microcontroller, integrated circuit, or other suitable processing device. The memory device(s) of controller 112 can include any suitable computing system or media, including, but not limited to, non-transitory computer-readable media, RAM, ROM, hard drives, flash drives, or other memory devices. The memory of controller 112 can store information accessible by processor(s) of controller 112, including instructions that can be executed by processor(s) of controller 112 in order to provide functionality to first appliance 110. For instance, controller 112 can execute one or more software applications or control logic for certain functionality operations, e.g., causing speaker 116 to generate one or more audible communications (e.g., tones). Controller 112 is communicatively coupled with network interface 114, speaker 116, and the proximity device, including proximity sensor 118 and/or camera 119.

Generally, network interface 114 of first appliance 110 provides a means for first appliance 110 to connect to one or more networks, such as network 160, and also provides for consumers to connect to first appliance 110, e.g., via an electronic user device. Network interface 114 can include any suitable components for interfacing with network 160 and/or user devices. For example, network interface 114 can include transmitters, receivers, ports, antennas, or other suitable components for interfacing with network 150 and/or user devices. In some embodiments, network interface 114 is an onboard component of controller 112. In alternative embodiments, network interface 114 is an offboard component of controller 112. Network interface 114 can establish communication with one or more networks and/or user devices in any suitable manner, e.g., via a wired or wireless communication link, and with any suitable protocol. As one example, network interface 114 can include an 802.11n 2.4 GHz Wi-Fi radio. Network interface 114 can include suitable hardware for interfacing with other wireless network types as well, such as e.g., Wi-Fi networks generally (IEEE 802.11 networks), ZigBee (IEEE 802.15-4), Bluetooth Low Energy (LE), and Bluetooth Mesh. Additionally or alternatively, in some embodiments, network interface 114 can include hardware and/or input/output ports for connecting with network 160 is a wired communication link. That is, in addition or alternatively to connecting wirelessly with network 160 and/or user devices, first appliance 110 can be connected to network 160 and/or user devices via a wired connection.

Network 160 can be any suitable type of network, such as a local area network (e.g., intranet), wide area network (e.g., internet), low power wireless networks, e.g., Bluetooth Low Energy (BLE), or some combination thereof and can include any number of wired or wireless links. In general, communication over network 160 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The communication module of first appliance 110 includes one or more speakers, as noted above. For this embodiment, the communication module of first appliance 100 includes speaker 116 and can include other devices, such as a microphone. As will be explained further below, in response to one or more sound commands (e.g., electrical signals), speaker 116 is operable to generate one or more audible communications, such as one or more tones to direct a consumer's attention to first appliance 110 or another appliance 120, 130, 140, 150 of system 100. Speaker 116 can be any suitable type of speaker operable to generate audible communications or sounds.

As further shown in FIG. 1, first appliance 110 includes one or more proximity devices. For this embodiment, first appliance 110 includes proximity sensor 118 and camera 119. Proximity sensor 118 can be any suitable type of sensor operable to detect the presence of a consumer proximate first appliance 110, e.g., within a proximity range thereof. Proximity sensor 118 can use electromagnetic fields, light, and/or sound to detect the presence of a consumer. The proximity range in which proximity sensor 118 can detect a consumer can be varied or sized to the physical layout of a consumer's home. For instance, the proximity range can be set such that proximity sensor 118 detects a consumer when he or she enters a kitchen where first appliance 110 is located. In some embodiments, in addition to simply detecting the presence of a consumer within a proximity range of first appliance 110, proximity sensor 118 is operable to detect a user location of the consumer when the consumer is in the proximity range of proximity sensor 118. To provide enhanced accuracy of the user location of the consumer, signals or feedback from proximity sensor 118 can be used in conjunction with other proximity devices of first appliance 110 (e.g., camera 119) and/or proximity sensors of the other appliances 120, 130, 140, 150 of system 100.

Camera 119 can be any suitable type of camera operable to capture still images or video. In some embodiments, camera 119 can capture one or more images and/or video of a consumer or other object located within the proximity range of first appliance 110. The captured images and/or video can be routed to controller 112 for processing, and based on the captured images and/or video, controller 112 can cause speaker 116 to generate an audible communication, e.g. an alert. In some instances, based on the captured images and/or video, controller 112 can cause speaker 116 to not generate an audible communication. In some embodiments, camera 119 and/or a processing device of controller 112 can execute image recognition software, e.g., to distinguish between adults, pets, kids, etc. that are within proximity range of first appliance 110 or another appliance 120, 130, 140, 150 of the appliance suite of system 100. In this way, the type of audible communication, the volume or intensity of the audible communication, whether an audible communication is generated at all, etc. can be modified/changed based on who or what has been captured by camera 119. As noted above, camera 119 can be used in conjunction with proximity sensor 118 and/or other proximity sensors of appliances 120, 130, 140, 150. For instance, if one or more of the proximity sensors of appliances 110, 120, 130, 140, 150 detect a consumer (or other object in proximity range thereof), camera 119 can be activated by controller 112 to capture a still image or video of the object(s).

The other appliances of system 100 can include the same or similar features as first appliance 110. For instance, for this embodiment, second appliance 120 includes a controller 122, a network interface 124, one or more speakers 126, and a proximity device, such as proximity sensor 128. In some embodiments, second appliance 120 optionally does not include a proximity device. As further depicted in FIG. 1, third appliance 130 includes a controller 132, a network interface 134, one or more speakers 136, and a proximity device, such as proximity sensor 138. In some embodiments, third appliance 130 optionally does not include a proximity device. In addition, for this embodiment, fourth appliance 140 includes a controller 142, a network interface 144, one or more speakers 146, and a proximity device, such as proximity sensor 148. In some embodiments, fourth appliance 140 optionally does not include a proximity device. Further, for this embodiment, fifth appliance 150 includes a controller 152, a network interface 154, one or more speakers 156, and a proximity device, such as proximity sensor 158. In some embodiments, fifth appliance 150 optionally does not include a proximity device. The controllers, network interfaces, speakers, and proximity devices of second appliance 120, third appliance 130, fourth appliance 140, and fifth appliance 150 can be configured and function in the same or similar manner as controller 112, network interface 114, speaker 116, and proximity device(s) 118/119 of first appliance 110, respectively.

Figure 2:
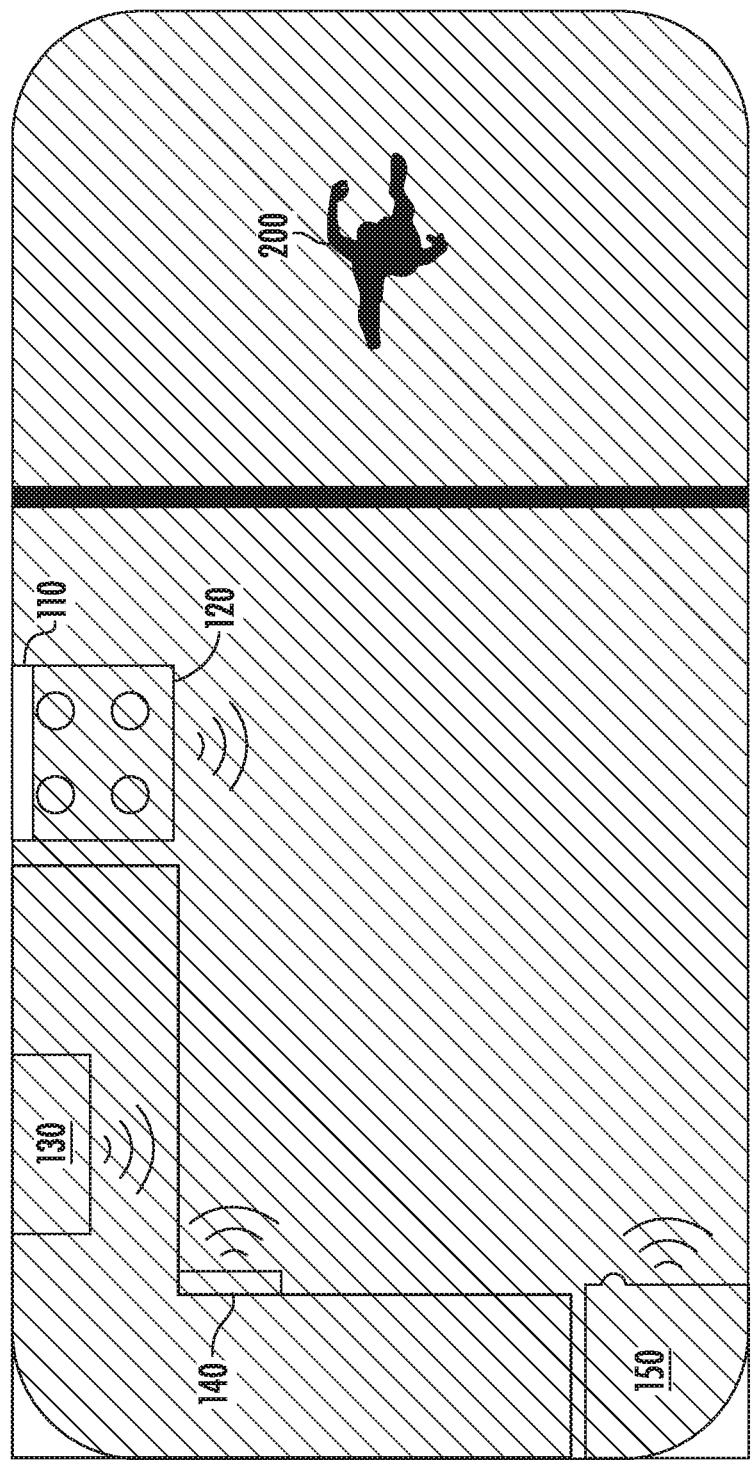
FIG. 2 provides a schematic top plan view of an appliance suite located within a kitchen of a consumer's home according to exemplary embodiments of the present disclosure.

Referring now to FIGS. 1 and 2, an example manner in which system 100 can generate synced audible communications will now be provided. As depicted, FIG. 2 provides a schematic top plan view of the appliance suite of system 100 of FIG. 1 located within a kitchen of a consumer's home. For this example, suppose a food item is in the process of being cooked in second appliance 120 (e.g., within the oven appliance thereof). Further, suppose that a countdown timer is scheduled to count down to zero (0) within a predetermined time of the present time, e.g., five seconds (5 s) from the present time. Further suppose that speaker 126 of second appliance 120 is scheduled to generate an audible communication (e.g., an alert) upon the expiration of the countdown timer (i.e., when the countdown timer reaches zero (0)). In this way, a user may know that his or her food item has finished cooking. Moreover, for this embodiment, suppose that controller 112 of first appliance 110 is a central or main controller of system 100. It will be appreciated that, in other embodiments, the main controller can be any of the other controllers of system 100 noted herein.

In anticipation of the sound trigger condition (e.g., the expiration of the countdown timer in this example), controller 112 of first appliance 110 (e.g., smart kitchen hub) can first determine whether a consumer or user is within a proximity range of second appliance 120. As one example, proximity sensor 128 of second appliance 120 can be used to detect whether a consumer is within a proximity range thereof. As another example, proximity sensor 128 of second appliance 120 and one or more other proximity sensors 118, 138, 148, 158 of system 100 can be used to detect whether a consumer is within a proximity range of second appliance 120. In some instances, when the user is in proximity range of two or more proximity sensors 118, 128, 138, 148, 158, the proximity sensors 118, 128, 138, 148, and/or 158 can collectively be used to detect a location of the user. As yet another example, camera 119 and/or another camera of system 100 can be used to detect whether a user is within a proximity range of second appliance 120. Based at least in part on one or more detection signals received from the one or more proximity devices, e.g., proximity sensors 118, 128, 138, 148, 158 and/or camera 119, controller 112 of first appliance 110 can output one or more sound commands.

As depicted in FIG. 2, a user 200 is located within the home but is not located within the proximity range of second appliance 120. Accordingly, the one or more detection signals received by controller 112 indicate that user 200 is not within proximity range of second appliance 120. Controller 112 outputs one or more sound commands based on the received detection signals. The sound commands output by controller 112 can be routed over network 160 to the appliances 110, 120, 130, 140, 150 of system 100. The respective controllers 122, 132, 142, 152 of the appliances 120, 130, 140, 150 of system 100 can receive the outputted sound commands (e.g. via their respective network interfaces). The sound commands can be routed to the respective speakers 116, 126, 136, 146, 156 of system 100, and in response to the one or more outputted sound commands, controller 112 can cause one, some, or all of speakers 116, 126, 136, 146, 156 to generate audible communications, e.g., an alert sound, based on the sound commands. For instance, for the present example, speakers 116, 126, 136, 146, 156 can generate audible communications in unison at the expiration of the countdown timer, effectively amplifying the alert indicating that the food item is finished cooking.

In an alternative example, if user 200 is located within the proximity range of second appliance 120 as sensed by one or more proximity devices 118, 119, 128, 138, 148, 158 of system 100, controller 112 can output one or more sound commands that cause only speaker 126 of second appliance 120 to generate an audible communication. As another example, if user 200 is located within the proximity range of second appliance 120, controller 112 can output one or more sound commands that cause speaker 126 of second appliance 120 and a subset of speakers 116, 136, 146, and 156 to generate audible communications, e.g., in unison. Accordingly, system 100 can be configured to amplify audible communications using some or all of the speakers of the appliances 110, 120, 130, 140, 150 or can simply cause an audible communication to be generated by the in-use appliance (e.g., second appliance 120 in the above example) based at least in part on whether the user is located within proximity range of the in-use appliance.

Further, in some embodiments, if an object is detected within proximity range of the in-use appliance, camera 119 can be used to confirm that the object is in fact an adult user. For instance, if the detected object is a dog or child, controller 112 can output, based on one or more detection signals received from camera 119, sound commands that cause all or some of the speakers 116, 126, 136, 146, and/or 156 to generate audible communications despite the presence of the object within proximity to the in-use appliance.

In addition, in some embodiments, the sound commands outputted by controller 112 can be based at least in part on the type or criticality of the audible communication to be generated. For instance, audible communications to be generated by a speaker of an appliance can be classified based on criticality, e.g., low critical alert, mid-critical alert, and high critical alert. For example, with respect to an oven appliance, a low critical alert may correspond with a "check food alert," a mid-critical alert can correspond with a "food is done alert," and a high critical alert may correspond with an "oven on fire alert." In such embodiments, based at least in part on the criticality of the audible communication to be generated, controller 112 can output one or more sound commands that cause the speakers 116, 126, 136, 146, 156 to generate an audible communication proportional to the criticality classification of the alert. For instance, the number of speakers 116, 126, 136, 146, 156 caused to generate an audible communication by controller 112 can be selected based on the criticality of the audible communication to be generated and the volume or intensity in which the speakers generate the audible communication can be selected based on the criticality of the audible communication to be generated. For example, for a high critical alert, controller 112 can generate one or more sound commands that cause all speakers 116, 126, 136, 146, 156 to generate audible communications; for a mid-critical alert, controller 112 can generate one or more sound commands that cause three (3) of speakers 116, 126, 136, 146, 156 to generate audible communications; and a low critical alert, controller 112 can generate one or more sound commands that cause two (2) of speakers 116, 126, 136, 146, 156 to generate audible communications.

Figure 3:
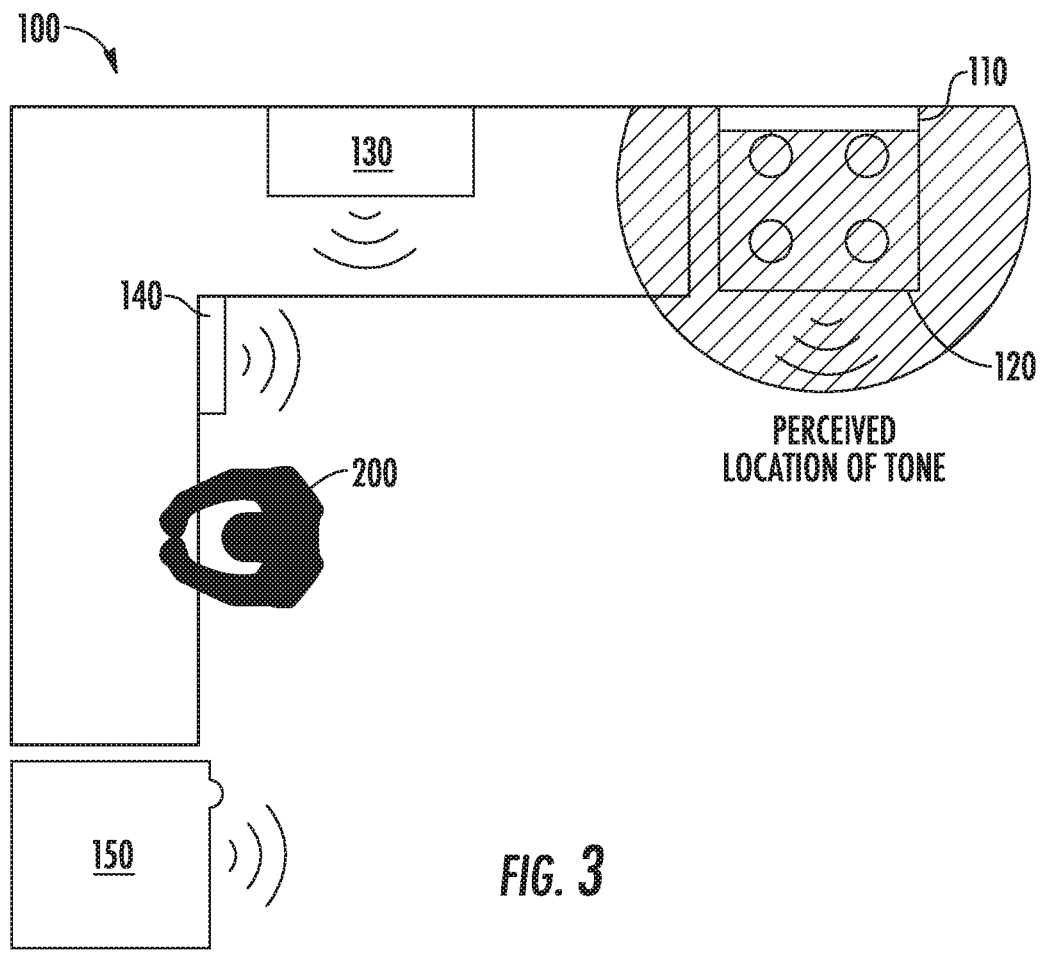
FIG. 3 provides another schematic top plan view of an appliance suite located within a kitchen of a consumer's home according to exemplary embodiments of the present disclosure.

Referring now to FIGS. 1 and 3, another example manner in which system 100 can generate synced audible communications will be provided. Particularly, the manner in which system 100 generates sound localization cues to draw a user's attention to a particular appliance or area will now be provided. FIG. 3 provides another schematic top plan view of the appliance suite of system 100 of FIG. 1 located within a kitchen of a consumer's home.

For this example, suppose it is desired to draw a user's attention to second appliance 120, e.g., for a check food alert. Controller 112 of first appliance 110 (e.g., smart kitchen hub) can first determine whether a user is within a proximity range of second appliance 120. Controller 112 of first appliance 110 can determine whether a user is within proximity range of second appliance 120 in any suitable manner described herein. For instance, one or more proximity devices of the appliances of system 100 can be used, singularly or collectively, to detect whether a user is within a proximity range of second appliance 120. In some instances, the location of user can also be determined, e.g., by using camera 119 and/or using a plurality of proximity sensors 118, 128, 138, 148, and/or 158. The one or more proximity sensors and/or camera 119 can send or route one or more detection signals to controller 112. The one or more detection signals are indicative of whether a user is within a proximity range of the in-use appliance (e.g., second appliance 120 in this example), and in some instances, the location of the user.

Based at least in part on one or more detection signals received from the one or more proximity devices, e.g., proximity sensors 118, 128, 138, 148, 158 and/or camera 119, controller 112 of first appliance 110 can output one or more sound commands. In this example, the one or more outputted sound commands can cause the one or more speakers 116, 126, 136, 146, 156 of system 100 to generate audible communications, and more particularly, the one or more outputted sound commands can cause the one or more speakers 116, 126, 136, 146, 156 to generate one or more sound localization cues to draw a user's attention to a particular appliance of system 100.

For instance, for the depicted embodiment of FIG. 3, the sound commands outputted by controller 112 can cause speaker 126 of second appliance 120 to generate a first audible communication and cause speakers 116, 136, 146, 156 to generate a second audible communication. The first audible communication and the second audible communications can be generated such that speakers 116, 126, 136, 146, 156 play their respective communications in unison or at the same time. Notably, the first audible communication can have a distinguishing characteristic that differentiates the first audible communication from the second audible communication. For example, the distinguishing characteristic of the first audible communication can be at least one of a different volume (e.g., the first audible communication generated by speaker 126 can be played at a higher or lower volume than the second audible communications generated by speakers 116, 136, 146, 156), a different frequency (e.g., the first audible communication generated by speaker 126 can be played at a faster or slower rate than the second audible communications generated by speakers 116, 136, 146, 156), a different duration, and a pitch.

For the depicted embodiment of FIG. 3, for example, speaker 126 of second appliance 120 can generate the first audible communication and speakers 116, 136, 146, 156 of appliances 110, 130, 140, 150 can generate the second audible communication such that the perceived location of the tone or attention of the user is drawn to second appliance 120. Specifically, for this embodiment, the first audible communication played by speaker 126 is generated at a louder volume and at a higher frequency than the second audible communication played by speakers 116, 136, 146, 156. In this way, user 200 can easily perceive the origination of the audible communication and the attention of user 200 is drawn to second appliance 120.

In alternative embodiments, each of the speakers 116, 126, 136, 146, 156 of system 100 can generate different audible communications. In such embodiments, the in-use appliance (e.g., second appliance 120 from the example above) is configured to generate an audible communication that has a human-perceived distinguishing characteristic from all other audible communications. For instance, supposing second appliance 120 is the appliance in-use, a first audible communication can be generated by speaker 126 and the other speakers of system 100 can generate second, third, fourth, and fifth audible communications that are distinguishable from the first audible communication and different from one another.

Figure 4:
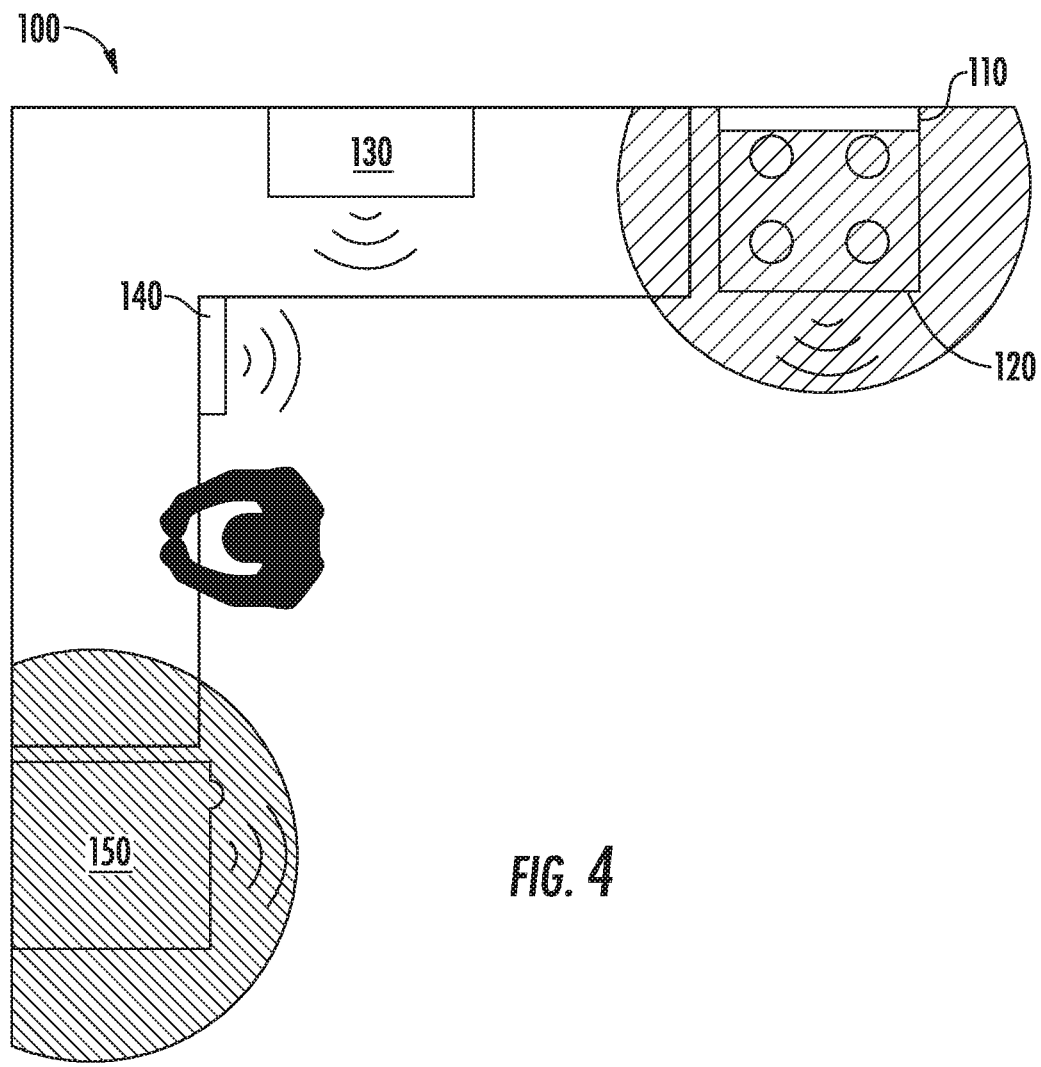
FIG. 4 provides yet another schematic top plan view of the appliance suite of system of FIG. 1 located within a kitchen of a consumer's home.

Referring now to FIGS. 1 and 4, yet another example manner in which system 100 can generate synced audible communications will be provided. Particularly, the manner in which system 100 generates sound localization cues to draw a user's attention to a particular appliance or area will now be provided. FIG. 4 provides yet another schematic top plan view of the appliance suite of system 100 of FIG. 1 located within a kitchen of a consumer's home.

For this example, suppose it is desired once again to draw a user's attention to second appliance 120, e.g., for a check food alert. Controller 112 of first appliance 110 (e.g., smart kitchen hub) can first determine whether a user is within a proximity range of second appliance 120. Controller 112 of first appliance 110 can determine whether a user is within proximity range of second appliance 120 in any suitable manner described herein. For instance, one or more proximity devices of the appliances of system 100 can be used, singularly or collectively, to detect whether a user is within a proximity range of second appliance 120. In some instances, the location of user can also be determined, e.g., by using camera 119 and/or using a plurality of proximity sensors 118, 128, 138, 148, and/or 158. The one or more proximity sensors and/or camera 119 can send or route one or more detection signals to controller 112. The one or more detection signals are indicative of whether a user is within a proximity range of the in-use appliance (e.g., second appliance 120 in this example), and in some instances, the location of the user.

Based at least in part on one or more detection signals received from the one or more proximity devices, e.g., proximity sensors 118, 128, 138, 148, 158 and/or camera 119, controller 112 of first appliance 110 can output one or more sound commands. In this example, the one or more outputted sound commands can cause the one or more speakers 116, 126, 136, 146, 156 of system 100 to generate audible communications, and more particularly, the one or more outputted sound commands can cause the one or more speakers 116, 126, 136, 146, 156 to generate one or more sound localization cues to draw a user's attention to a particular appliance of system 100. Particularly, one or more audible communications generated by one or more speakers of system 100 can be alternated or staggered with one or more audible communications generated by one or more other speakers to create an oscillatory sound effect.

For instance, for the depicted embodiment of FIG. 4, the sound commands outputted by controller 112 can cause speaker 126 of second appliance 120 to generate a first audible communication and cause speaker 156 of fifth appliance 150 to generate a second audible communication. For example, speaker 126 of second appliance 120 can generate a first audible communication for one hundred fifty milliseconds (150 ms) and then speaker 156 of fifth appliance 150 can generate a second audible communication for one hundred fifty milliseconds (150 ms), and so in a repeating manner. In this way, improved salience and audibility of the perceived audible communication can result.

In some embodiments, to further draw the attention of user 200 to the in-use appliance (e.g., second appliance 120 in the example above), the first audible communication generated by speaker 126 of second appliance 120 can have a dominant characteristic over the second audible communication generated by speaker 156 of fifth appliance 150. For instance, the first audible communication be played louder, at a higher frequency, at a higher pitch, etc. so that a user's attention is more drawn to second appliance 120 (e.g., the appliance in-use) than the supporting appliance.

Figure 5:
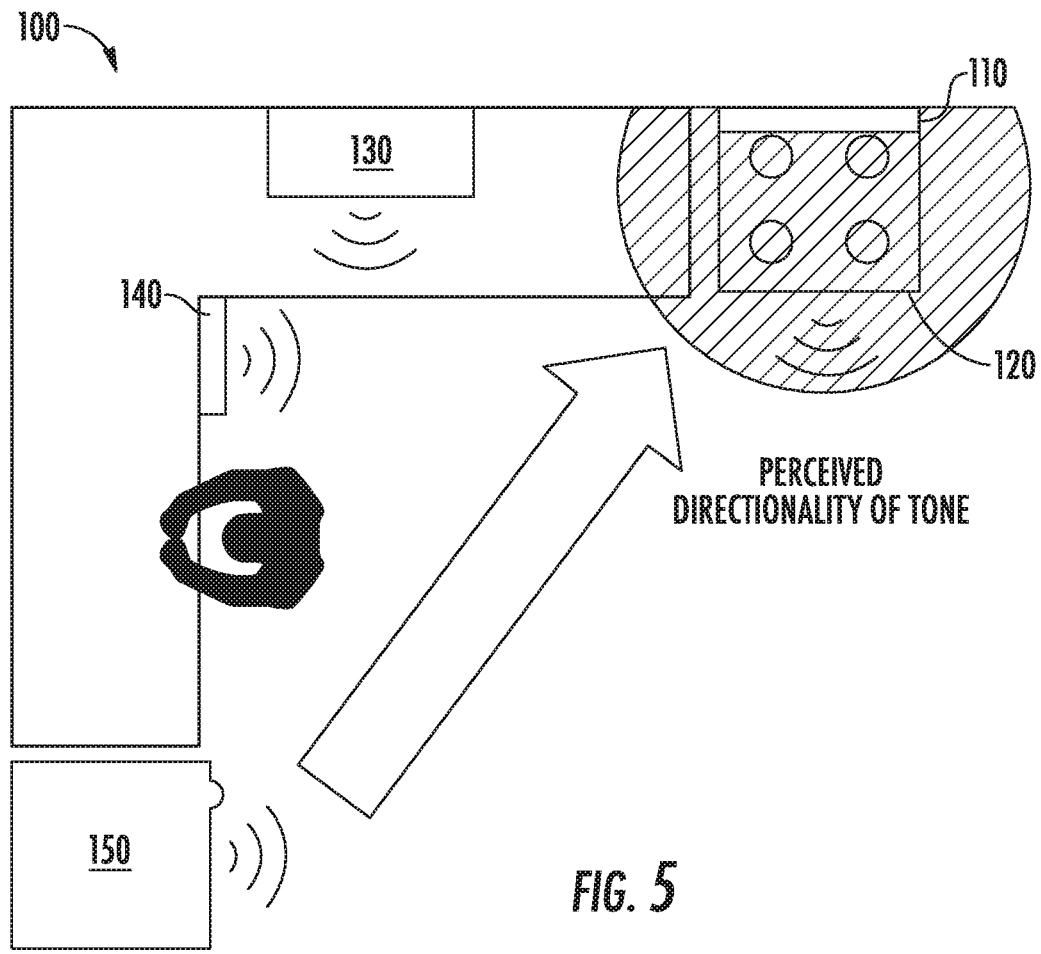
FIG. 5 provides a further schematic top plan view of the appliance suite of system of FIG. 1 located within a kitchen of a consumer's home.

Referring now to FIGS. 1 and 5, a further example manner in which system 100 can generate synced audible communications will be provided. Particularly, the manner in which system 100 generates sound localization cues to draw a user's attention to a particular appliance or area will now be provided. FIG. 5 provides a further schematic top plan view of the appliance suite of system 100 of FIG. 1 located within a kitchen of a consumer's home.

For this example, suppose it is desired to draw a user's attention to second appliance 120, e.g., for a check food alert. Controller 112 of first appliance 110 (e.g., smart kitchen hub) can first determine whether a user is within a proximity range of second appliance 120. Controller 112 of first appliance 110 can determine whether a user is within proximity range of second appliance 120 in any suitable manner described herein. For instance, one or more proximity devices of the appliances of system 100 can be used, singularly or collectively, to detect whether a user is within a proximity range of second appliance 120. In some instances, the location of user can also be determined, e.g., by using camera 119 and/or using a plurality of proximity sensors 118, 128, 138, 148, and/or 158. The one or more proximity sensors and/or camera 119 can send or route one or more detection signals to controller 112. The one or more detection signals are indicative of whether a user is within a proximity range of the in-use appliance (e.g., second appliance 120 in this example), and in some instances, the location of the user.

Based at least in part on one or more detection signals received from the one or more proximity devices, e.g., proximity sensors 118, 128, 138, 148, 158 and/or camera 119, controller 112 of first appliance 110 can output one or more sound commands. In this example, the one or more outputted sound commands can cause the one or more speakers 116, 126, 136, 146, 156 of system 100 to generate audible communications, and more particularly, the one or more outputted sound commands can cause the one or more speakers 116, 126, 136, 146, 156 to generate one or more sound localization cues to draw a user's attention to a particular appliance of system 100. Particularly, for this embodiment, one or more audible communications generated by one or more speakers of system 100 can create the perception of movement toward the desired or in-use appliance.

For instance, for the depicted embodiment of FIG. 5, the sound commands outputted by controller 112 can cause some or all of speakers 116, 126, 136, 146, 156 to create the perception of movement toward second appliance 120. In some embodiments, it is known that user 200 is within proximity range of second appliance 120 but the precise location of user 200 is not known. In such embodiments, for example, some or all of the speakers of system 100 can be used to create the perception of movement toward second appliance 120. Particularly, based on the sound commands outputted by controller 112, speaker 156 of fifth appliance 150 generates a first audible communication. Next, after a first predetermined delay, speaker 146 of fourth appliance 140 generates a second audible communication. After a second predetermined delay, speaker 136 of third appliance 130 generates a third audible communication. After a third predetermined delay, speaker 136 of second appliance 120 generates a fourth audible communication. The predetermined time delays can overlap one another (e.g., up to 50% for example) or not overlap one another. By playing the audible communications in the order noted above the perception of movement toward second appliance 120 is created thereby drawing the user's attention to second appliance 120.

In some embodiments, one or more characteristics of the audible communications can be changed or modified with increasing or decreasing effect with each generated audible communication. For instance, with reference to the example above, the first audible communication generated by speaker 156 can be played at a first volume, the second audible communication generated by speaker 146 can be played at a second volume that is louder than the first volume, the third audible communication generated by speaker 136 can be played at a third volume that is louder than the second volume, and the fourth audible communication generated by speaker 126 can be played at a fourth volume that is louder than the third volume. By sequentially increasing the loudness or intensity of the audible communications, the perception of movement toward second appliance 120 is created.

In some embodiments, it is known that user 200 is within proximity range of second appliance 120 and the precise location of user 200 is known. In such embodiments, the user's location can be used by controller 112 to determine which of the speakers of system 100 to cause to generate audible communications. For example, with reference to FIG. 5, based on detection signals received from proximity devices of system 100, controller 112 determines that user 200 is positioned at a sink within the kitchen, which is located between fifth appliance 150 and fourth appliance 140 as shown in FIG. 5. Based on the determined location of user 200, controller 112 can generate sound commands that cause speakers of system 100 to sequentially draw the attention of user 200 toward second appliance 120 (or more generically the appliance in-use). Particularly, based on the sound commands outputted by controller 112, controller 112 causes fourth appliance 140 to generate a first audible communication. The attention of user 200 is thus drawn immediately to his or her right if they are facing the sink as shown in FIG. 5. Next, after a first predetermined delay, speaker 136 of third appliance 130 generates a second audible communication. After a second predetermined delay, speaker 126 of second appliance 120 generates a third audible communication. The predetermined time delays can overlap one another or not overlap one another. By playing the audible communications in the order noted above the perception of movement toward second appliance 120 is created thereby drawing the user's attention to second appliance 120, and advantageously, the perception of movement is created based on the user's known location. In this way, as in the example above, the attention of user 200 can immediately be drawn in the correct direction.

The various embodiments described herein can provide a number of benefits and advantages. For instance, system 100 can provide an immersive and intuitive sonic experience for users with respect to their appliance suites, which can reduce the mental workload and stress of appliance users. Audible communications, such as alarm tones, are made more audible and salient, and thus, as one benefit, users can perform or accomplish more multi-tasking throughout the home. Furthermore, a more engaging kitchen experience can be provided, which can result in more family cohesion during meals and meal prep.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
   a first appliance having a first speaker and a first proximity sensor operable to detect a user within a proximity range of the first proximity sensor;
   a second appliance having a second speaker and a second proximity sensor operable to detect a user within a proximity range of the second proximity sensor, the proximity range of the second proximity sensor overlapping at least in part with the proximity range of the first proximity sensor; and
   one or more controllers communicatively coupled with the first speaker, the second speaker, the first proximity sensor, and the second proximity, the one or more controllers being configured to:
      receive, from the first proximity sensor and the second proximity sensor, detection signals indicating the user is within the proximity range of the first proximity sensor and the proximity range of the second sensor and a location of the user; and
      output one or more sound commands based at least in part on the received detection signals, and
   wherein the first speaker is configured to:
      receive at least one of the one or more sound commands output by the one or more controllers; and
      in response to the received at least one of the one or more sound commands, generate one or more audible communications, and
   wherein the second speaker is configured to:
      receive at least one of the one or more sound commands output by the one or more controllers; and
      in response to the received at least one of the one or more sound commands, generate one or more audible communications such that the one or more audible communications generated by the first speaker and the one or more audible communications generated by the second speaker are synced.

2. The system of claim 1, wherein at least one of the first appliance and the second appliance have a camera operable to detect a user within a proximity range of at least one of the first appliance and the second appliance, the camera being communicatively coupled with the one or more controllers, and wherein the one or more controllers are configured to:
        receive, from the camera, a detection signal indicating whether the user is within the proximity range of at least one of the first appliance and the second appliance and including one or more images of the user within the proximity range;
        when the user is within the proximity range of at least one of the first appliance and the second appliance, classify the user based at least in part on the one or more images of the user received as part of the detection signal; and
        wherein the one or more sound commands are output by the one or more controllers based at least in part on the classification of the user.

3. The system of claim 1, wherein the one or more audible communications generated by the first speaker correspond to a first audible communication and the one or more audible communications generated by the second speaker correspond to a second audible communication, the first audible communication having a distinguishing characteristic that differentiates the first audible communication from the second audible communication.

4. The system of claim 1, wherein the one or more audible communications generated by the first speaker of the first appliance and the one or more audible communications generated by the second speaker of the second appliance are generated in unison.

5. The system of claim 1, wherein the one or more audible communications generated by the one or more speakers of the first appliance are alternated with the one or more audible communications generated by the one or more speakers of the second appliance to create an oscillatory sound effect.

6. The system of claim 1, further comprising:
    a third appliance having a third speaker, the third speaker being communicatively coupled with the one or more controllers;
    wherein the third speaker is configured to:
        receive at least one of the one or more sound commands output by the one or more controllers; and
        in response to the received at least one of the one or more sound commands, generate one or more audible communications such that the one or more audible communications generated by the third speaker are synced with the one or more audible communications generated by the first speaker and the one or more audible communications generated by the second speaker, and
    wherein in synchronizing the one or more audible communications generated by the first speaker, the second speaker, and the third speaker:
        i) the one or more audible communications generated by the first speaker are first generated,
        ii) the one or more audible communications generated by the second speaker are generated after a first predetermined delay of the one or more audible communications generated by the first speaker, and
        iii) the one or more audible communications generated by the third speaker are generated after a second predetermined delay of the one or more audible communications generated by the second speaker.

7. The system of claim 6, wherein the first appliance is located closer to a user than the second appliance and the second appliance is located closer to the user than the third appliance.

8. The system of claim 1, further comprising:
    a proximity device; and
    wherein the one or more controllers are configured to:
        receive, from the proximity device, a detection signal indicating a user is not within a proximity range of the proximity device; and
        in response to the detection signal, output the one or more sound commands such that the one or more audible communications generated by the first speaker and the one or more audible communications generated by the second speaker are generated in unison to produce a collective amplified audible communication.

9. The system of claim 1, wherein the one or more controllers include only a main controller, the main controller being mounted to a kitchen hub appliance.

10. A method, comprising:
    receiving, by one or more controllers, one or more detection signals indicative of whether a user is within a proximity range of a proximity device of at least one of a first appliance and a second appliance;
    outputting, by the one or more controllers, one or more sound commands based at least in part on whether the user is within the proximity range of the proximity device of at least one of the first appliance and the second appliance;
    generating, by a first speaker of the first appliance, one or more audible communications based at least in part on the one or more sound commands; and
    generating, by a second speaker of the second appliance, one or more audible communications based at least in part on the one or more sound commands, and
    wherein the one or more audible communications generated by the first speaker and the one or more audible communications generated by the second speaker are generated such that one or more audible communications generated by the first speaker alternate with the one or more audible communications generated by the second speaker to create an oscillatory sound effect.

11. The method of claim 10, wherein the proximity device is at least one of a proximity sensor and a camera.

12. The method of claim 10, wherein in generating, by the first speaker of the first appliance, the one or more audible communications based at least in part on the one or more sound commands and generating, by the second speaker of the second appliance, the one or more audible communications based at least in part on the one or more sound commands, the one or more audible communications generated by the first speaker and the one or more audible communications generated by the second speaker are generated in a synced manner.

13. The method of claim 10, further comprising:
    determining, by the one or more controllers, whether a user is within the proximity range of the proximity device of at least one of the first appliance and the second appliance based at least in part on the one or more detection signals;
    wherein when the user is not within the proximity range of the proximity device, the one or more audible communications generated by the first speaker and the one or more audible communications generated by the second speaker are generated in unison to produce a collective amplified audible communication.

14. The method of claim 10, further comprising:
generating, by a third speaker of a third appliance, one or more audible communications based at least in part on the one or more sound commands, and
wherein the one or more audible communications generated by the third speaker are synced with the one or more audible communications generated by the first speaker and the one or more audible communications generated by the second speaker such that:
i) the one or more audible communications generated by the first speaker are generated first,
ii) the one or more audible communications generated by the second speaker are generated after a first predetermined delay of the one or more audible communications generated by the first speaker, and
iii) the one or more audible communications generated by the third speaker are generated after a second predetermined delay of the one or more audible communications generated by the second speaker.

15. The method of claim 10, wherein the one or more audible communications generated by the first speaker correspond to a first audible communication and the one or more audible communications generated by the second speaker correspond to a second audible communication, and wherein the first audible communication has a human-perceivable distinguishing characteristic that differentiates the first audible communication from the second audible communication.

16. A system, comprising:
a proximity device;
a first appliance having a first speaker;
a second appliance having a second speaker; and
one or more controllers communicatively coupled with the first speaker, the second speaker, and the proximity device, the one or more processors being configured to:
receive, from the proximity device, a detection signal indicating a user is not within a proximity range of the proximity device; and
in response to the detection signal, output one or more sound commands;
wherein the first speaker is configured to:
receive at least one of the one or more sound commands output by the one or more controllers; and
in response to the received at least one of the one or more sound commands, generate one or more audible communications, and
wherein the second speaker is configured to:
receive at least one of the one or more sound commands output by the one or more controllers; and
in response to the received at least one of the one or more sound commands, generate one or more audible communications, and
wherein the one or more audible communications generated by the first speaker and the one or more audible communications generated by the second speaker are generated in unison to produce a collective amplified audible communication.

17. The system of claim 16, wherein at least one of the first appliance and the second appliance have a camera operable to detect a user within a proximity range of at least one of the first appliance and the second appliance, the camera being communicatively coupled with the one or more controllers, and
wherein the one or more controllers are configured to:
receive, from the camera, a detection signal indicating whether the user is within the proximity range of at least one of the first appliance and the second appliance and including one or more images of the user within the proximity range;
when the user is within the proximity range of at least one of the first appliance and the second appliance, classify the user based at least in part on the one or more images of the user received as part of the detection signal; and
wherein the one or more sound commands are output by the one or more controllers based at least in part on the classification of the user.

18. The system of claim 16, wherein the one or more audible communications generated by the one or more speakers of the first appliance are alternated with the one or more audible communications generated by the one or more speakers of the second appliance to create an oscillatory sound effect.

19. The system of claim 16, wherein the first appliance has a first proximity sensor operable to detect a user within a proximity range of the first proximity sensor and the second appliance has a second proximity sensor operable to detect a user within a proximity range of the second proximity sensor, the proximity range of the second proximity sensor overlapping at least in part with the proximity range of the first proximity sensor, the first proximity sensor and the second proximity sensor being communicatively coupled with the one or more controllers, and
wherein the one or more controllers are configured to:
receive, from the first proximity sensor and the second proximity sensor, detection signals indicating the user is within the proximity range of the first proximity sensor and the proximity range of the second sensor and a location of the user; and
wherein the one or more sound commands are output by the one or more controllers based at least in part on the received detection signals.

20. The system of claim 16, wherein the one or more audible communications generated by the first speaker correspond to a first audible communication and the one or more audible communications generated by the second speaker correspond to a second audible communication, the first audible communication being generated at a louder volume and at a higher frequency than the second audible communication.

* * * * *